US012055820B2

United States Patent
Basu

(10) Patent No.: US 12,055,820 B2
(45) Date of Patent: Aug. 6, 2024

(54) UTILIZING VERTICALLY ALIGNED CARBON NANOTUBE ARRAYS AS THE HOMEOTROPIC ALIGNMENT AGENT IN AN ELECTRO-OPTIC LIQUID CRYSTAL DEVICE

(71) Applicant: The Government of the United States of America, as represented by the Secretary of the Navy, Arlington, VA (US)

(72) Inventor: Rajratan Basu, Columbia, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 106 days.

(21) Appl. No.: 17/526,395

(22) Filed: Nov. 15, 2021

(65) Prior Publication Data

US 2022/0291552 A1    Sep. 15, 2022

Related U.S. Application Data

(60) Provisional application No. 63/158,878, filed on Mar. 9, 2021.

(51) Int. Cl.
*G02F 1/1337* (2006.01)
*G02F 1/00* (2006.01)
*G02F 1/061* (2006.01)

(52) U.S. Cl.
CPC ...... *G02F 1/133719* (2013.01); *G02F 1/0018* (2013.01); *G02F 1/061* (2013.01); *G02F 1/133715* (2021.01)

(58) Field of Classification Search
CPC ............. G02F 1/1337; G02F 1/133742; G02F 1/13439; C09K 2323/021; C09K 19/56
See application file for complete search history.

(56) References Cited

PUBLICATIONS

"Homeotropic Liquid Crystal Device Employing Vertically Aligned Carbon Nanotube Arrays as the Alignment Agent," Physical Review E 102, by Basu, Rajratan and Atwood, Lukas J., published by the American Physical Society on Aug. 17, 2020 (Year: 2020).*
Basu, Rajratan, Charles Rosenblatt, and Robert P. Lemieux. "Chiral induction in thioester and oxoester liquid crystals by dispersed carbon nanotubes." Liquid Crystals 39.2 (2012): 199-204.
Basu, Rajratan, and Germano S. Iannacchione. "Nematic anchoring on carbon nanotubes." Applied physics letters 95.17 (2009): 173113.
(Continued)

*Primary Examiner* — Angela K Davison
(74) *Attorney, Agent, or Firm* — U.S. Naval Academy; Stephen T. Hunnius

(57) ABSTRACT

An electro-optical liquid crystal cell comprising a first substrate, a first layer of chromium (Cr), a first layer of vertically aligned carbon nanotubes (VA-CNT) capped with nickel nanoparticles, and a layer of liquid crystal. Furthermore, the electro-optical liquid crystal cell can comprise a second layer of VA-CNT capped with nickel nanoparticles, a second layer of Cr, and a second substrate. This electro-optic VA-CNT-based liquid crystal cell exhibits the required electro-optic effect needed for a liquid crystal display.

20 Claims, 4 Drawing Sheets

(56) References Cited

PUBLICATIONS

Basu, Rajratan, and Alfred Garvey. "Insulator-to-conductor transition in liquid crystal-carbon nanotube nanocomposites." Journal of Applied Physics 120.16 (2016): 164309.

Kalakonda, Parvathalu, et al. "Studies of nanocomposites of carbon nanotubes and a negative dielectric anisotropy liquid crystal." The Journal of chemical physics 140.10 (2014): 104908.

Basu, Rajratan, and Germano S. Iannacchione. "Orientational coupling enhancement in a carbon nanotube dispersed liquid crystal." Physical Review E 81.5 (2010): 051705.

M.-Z. Chen, W.-S. Chen, S.-C. Jeng, S.-H. Yang, and Y.-F. Chung, "Liquid crystal alignment on zinc oxide nanowire arrays for LCDs applications," Opt. Express 21(24) 29277-29282 (2013).

Basu, Rajratan, and Lukas J. Atwood. "Two-dimensional hexagonal boron nitride nanosheet as the planar-alignment agent in a liquid crystal-based electro-optic device." Optics express 27.1 (2019): 282-292.

Basu, Rajratan, and Lukas J. Atwood. "Electro-optic liquid crystal device employing two-dimensional WSe 2 as the planar-alignment layers." Optical Materials Express 10.6 (2020): 1405-1412.

Basu, Rajratan, and Lukas J. Atwood. "Homeotropic liquid crystal device employing vertically aligned carbon nanotube arrays as the alignment agent." Physical Review E 102.2 (2020): 022701.

\* cited by examiner

UTILIZING VERTICALLY ALIGNED CARBON NANOTUBE ARRAYS AS THE HOMEOTROPIC ALIGNMENT AGENT IN AN ELECTRO-OPTIC LIQUID CRYSTAL DEVICE

REFERENCE TO RELATED APPLICATION

This application is a non-provisional of, and claims priority to and the benefits of, U.S. Provisional Patent Application No. 63/158,878 filed on Mar. 9, 2021, the entirety of which is herein incorporated by reference.

BACKGROUND

This disclosure concerns utilizing vertically aligned carbon nanotube arrays as the homeotropic alignment agent in an electro-optical liquid crystal (LC) device and thereby improving its stability.

This disclosure concerns methods for achieving homeotropic-alignment of liquid crystals (LC) employing vertically aligned carbon nanotube (VA-CNT) arrays in an electro-optic LC device.

This disclosure concerns procedures for attaining electro-optic switching of an LC in this VA-CNT-based LC device.

A novel product is described herein with an inorganic nanostructure VA-CNT-based LC device that exhibits more stability than a regular organic polyimide (PI) alignment layer-based LC device.

In vertical-alignment (VA) liquid crystal (LC) cells (also called homeotropic LC cells), the LC material is initially aligned perpendicular to the substrates, and the application of an electric field perpendicular to the substrates can reorient the LC parallel to the substrate. This operation requires the LC material to be negative dielectric anisotropic so that it can align perpendicular to the electric field. These VA liquid crystal displays (LCDs) have many advantages compared to the traditional planar-nematic displays, such as a deeper black background, a higher on-axis contrast ratio, rubbing-free process (rubbing is not performed or no rubbing process), a wider viewing angle, and simultaneous usability of reflective and transmissive modes.

Conventionally, polyimide (PI) layers are used as the vertical-alignment agent in standard VA-LCDs, where the LC molecules align with the vertical part of the alkyl side chains of the PI layers. Consequently, the nematic phase achieves a homeotropic director profile inside the device.

However, these organic PI alignment layers have some disadvantages. For example, the PI layers are responsive to UV light and high temperature, and therefore, the alignment characteristics are affected when the PI-based LC devices are exposed to UV light and high temperature. Thus, various inorganic alignment-agents have been utilized recently in electro-optic LC devices. For example, planar-alignment of LC was achieved using graphene, hexagonal boron nitride, and tungsten diselenide; vertical-alignment of LC was achieved using nanoporous anodic aluminum oxide films, ZnO nanorod and nanowire arrays, a pillar-like structure with 2-3 μm pitch, and $SiO_x$ films. Photoaligning films are also very robust and possess excellent vertical-aligning properties.

Therefore, studying and understanding the alignment phenomena of the LC on different nanostructured substrates is an important avenue and has potential applications in designing novel LC devices.

This invention disclosure shows the homeotropic LC alignment on an inorganic nanostructured surface: vertically aligned carbon nanotube (VA-CNT) arrays and utilizes the VA-CNT arrays as the alignment agent to design an electro-optic homeotropic LC device.

Here, we demonstrate the first use of vertically aligned carbon nanotube arrays as the homeotropic alignment agent in an electro-optic LC device.

SUMMARY OF DISCLOSURE

Description

This disclosure concerns utilizing vertically aligned carbon nanotube arrays as the homeotropic alignment agent in an electro-optical liquid crystal (LC) device and thereby improving its stability.

This disclosure concerns methods for achieving homeotropic-alignment of liquid crystals (LC) employing vertically aligned carbon nanotube (VA-CNT) arrays in an electro-optic LC device.

This disclosure concerns procedures for attaining electro-optic switching of an LC in this VA-CNT-based LC device.

A novel product is described herein with a VA-CNT-based LC device that exhibits more stability than a regular polyimide (PI) alignment layer-based LC device.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

DETAILED DESCRIPTION OF THE INVENTION

This disclosure teaches methods and devices for utilizing vertically aligned carbon nanotube arrays as the homeotropic alignment agent in an electro-optical liquid crystal (LC) device and thereby improving its stability.

This disclosure concerns methods for achieving homeotropic-alignment of liquid crystals (LC) employing vertically aligned carbon nanotube (VA-CNT) arrays in an electro-optic LC device.

This disclosure concerns procedures for attaining electro-optic switching of an LC in this VA-CNT-based LC device.

A novel product is described herein with a VA-CNT-based LC device that exhibits more stability than a regular polyimide (PI) alignment layer-based LC device.

EXAMPLE 1

Fabrication of the Homeotropic Electro-Optic LC Cell Employing the VA-CNT Arrays A plasma-enhanced chemical vapor deposition (PECVD) system at the facilities at NanoLab, Inc. (Waltham, Massachusetts, USA) was commercially employed to grow VA-CNT arrays on chromium (Cr) coated glass substrates.

For growing the VA-CNT arrays, the glass substrates were first coated with a Cr adhesion layer (2 nm) and then overcoated with nickel nanoparticles.

In the PECVD system, the CNTs grow vertically from the substrate surface, and the CNTs are freestanding.

The CNT-length is related to the processing time, and the diameter depends primarily on the nickel particle size.

The PECVD grown CNTs had multilayer graphitic sidewalls and hollow core. Each CNT-tip was capped with a nickel nanoparticle. The PECVD system was tuned to produce the VA-CNT arrays with a CNT site density of $2 \times 10^9$ $cm^{-2}$, length 1.4-2 μm, and diameter 70-100 nm.

Figures 1A, 1B, 1C:
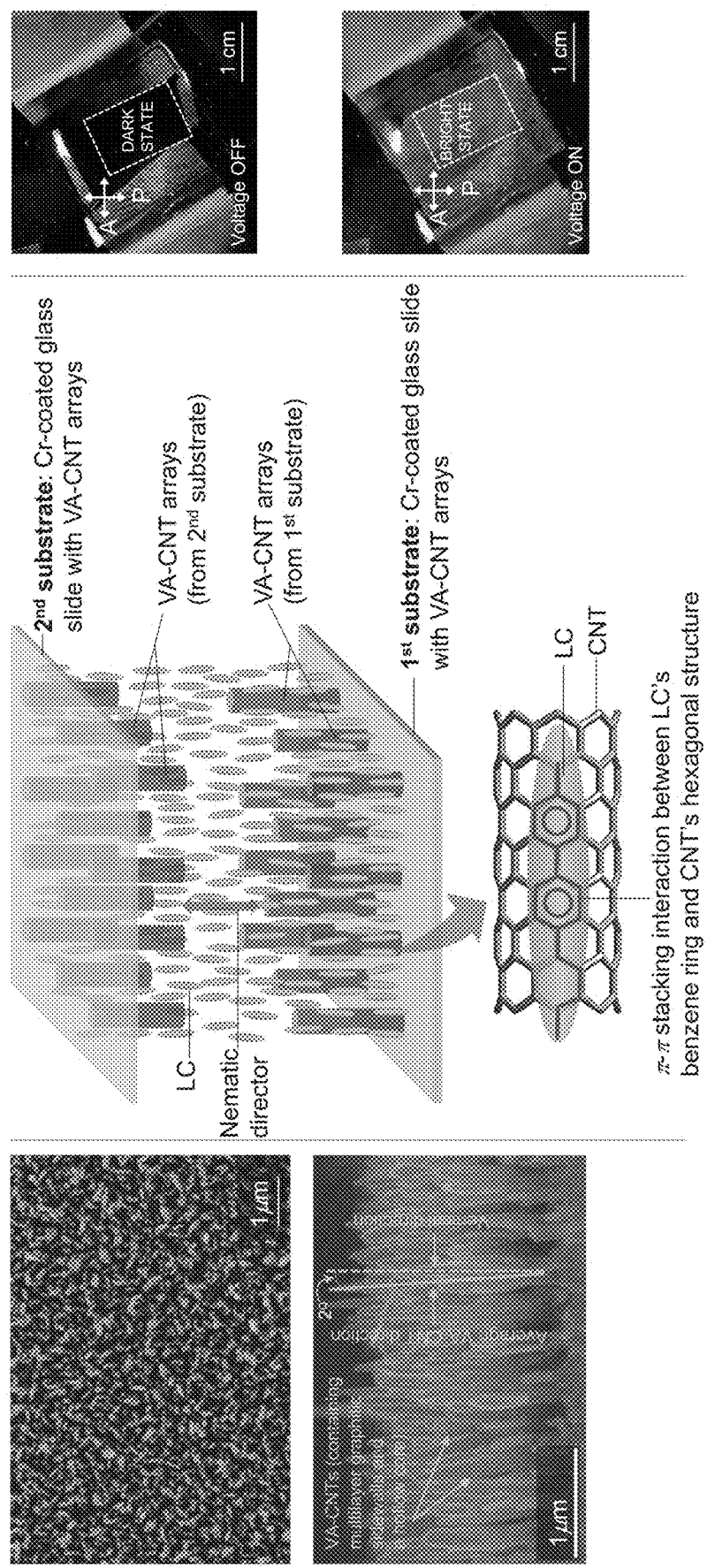
FIG. 1A is an SEM image of a top-view of VA-CNT arrays and an SEM image of a side-view of VA-CNT arrays. The dashed line shows the vertical direction, and the solid line shows the average deviation of the CNTs from the vertical.
FIG. 1B schematically illustrates the homeotropic LC device employing VA-CNT arrays. The LC-CNT interaction is illustrated below the device: the anchoring of an LC molecule on the CNT surface due to $\pi$-$\pi$ electron stacking. The ellipsoid is a generic LC molecule, and the black cylindrical honeycomb structure is a CNT surface.
FIG. 1C shows the pictures of a prototype of a VA-CNT arrays-based homeotropic LC cell sandwiched between two crossed polarizers with a backlight: voltage off state and voltage on (V=25V) state.

FIG. 1A shows the scanning electron microscope (SEM) images of a top-view and a side-view, respectively, of the VA-CNT arrays. This method produced slightly tilted (~2°) CNT arrays from the vertical direction. This tilt angle has a benefit in the LC switching mechanism, which is discussed later.

EXAMPLE 2

We put together two VA-CNT slides to make a cell with an average cell-gap, d=9 μm.

The cell was filled with a negative anisotropic LC material BYVA-01, which has a transition temperature $T_{NI}$=92° C., dielectric anisotropy $\Delta\varepsilon$=−4.9, and birefringence $\Delta n$=0.092.

The nematic LC director aligns vertically along the CNT-long axis at the two VA-CNT slides due to the π-π stacking interaction, and then, the entire cell achieves homeotropic alignment due to the nematic correlation from one slide to the other, as schematically shown in FIG. 1B.

EXAMPLE 3

The LC molecules anchor to the CNT wall to enhance π-π stacking by maximizing the hexagon-hexagon interaction between the LC's benzene rings and the CNT's honeycomb structure, as schematically shown in FIG. 1B.

The ellipsoid represents a generic LC molecule, and the black cylindrical honeycomb structure is a CNT surface in FIG. 1B. The molecular structure of a generic LC is shown in the ellipsoid on the CNT surface.

The π-π electron stacking interaction is illustrated by matching the LC's benzene rings on the CNT-honeycomb surface.

The anchoring energy associated with π-π stacking interaction $|U_{anchor}| \approx 2.0$ eV/molecule.

When CNTs are dispersed in an LC medium in colloidal form, this interaction leads the CNTs to align along the nematic director and the LC molecules align along the CNT-long axis on the CNT-surface.

This stable π-π electron stacking interaction between the LC and the CNT surface gives rise to several interesting phenomena, such as an increase in the nematic orientational order in an LC, the formation of pseudo-nematic LC domains surrounding the CNT-long axis in the isotropic phase, transfer of CNT surface chirality onto otherwise achiral LCs, and enhancement of polar anchoring energy. We have also previously shown that two-dimensional graphene sheets can serve as the planar-alignment agent in a homogeneous LC cell due to this π-π electron stacking interaction.

In the present work, this π-π electron stacking interaction is the fundamental principle of our VA-CNT arrays-based homeotropic LC cell, where the VA-CNT arrays direct the LC alignment in the vertical direction in the cell.

EXAMPLE 4

Thin Cr films (2 nm-10 nm) are highly transparent over the full wavelength range, still maintaining high electrical conductivity. Therefore, Cr films (2 nm-10 nm) can function as high-quality transparent electrodes.

In our PECVD method, a 2 nm Cr adhesion layer on each glass slide was used for the growth of the VA-CNT arrays. These Cr layers were employed as the transparent electrodes in the VA-CNT arrays-based homeotropic LC cell, and therefore, no indium tin oxide (ITO) electrodes were needed.

To realize the electro-optical functionality of this cell, it was first sandwiched between two crossed polarizers with a backlight, and the picture of the entire cell is shown in FIG. 1C. The black region in the dotted rectangle shows the homeotropic alignment of the LC inside the cell. Some regions outside the dotted rectangle show bright texture—these are the areas where Mylar spacer sheets were used to maintain an average cell-gap, d=9 μm. An ac voltage V=25V (f=1000 Hz) was then applied using the transparent Cr electrodes, and the region in the dotted rectangle was found to turn bright, as shown in FIG. 1C, which indicates the reorientation mechanism of the LC from homeotropic to planar state on the application of the voltage.

EXAMPLE 5

Now that we have established that the VA-CNT arrays-based homeotropic LC cell exhibits the required electro-optical effect, we have carried out the voltage-dependent transmittance experiment. This experiment was conducted using an optical setup where the cell was mounted on a rotational stage between two crossed polarizers.

A 5-mW He—Ne laser beam of wavelength 633 nm was sent through the polarizer, the VA-CNT arrays-based homeotropic LC cell, the crossed analyzer, and into a photodetector, which was fed into a dc voltmeter to measure the transmitted intensity.

An ac voltage V=40V (f=1000 Hz) was first applied across the cell to change the LC to planar orientation, and then the cell was rotated using the rotational stage to receive the maximum transmitted intensity at the dc voltmeter. This was done to ensure that when the LC achieved planar orientation on the application of the voltage, the nematic director n̂ in the cell was oriented at 45° with respect to the crossed polarizers. Then the ac voltage was turned off. Next, the applied ac voltage (f=1000 Hz) across the cell was gradually ramped up from 0V to 40V, and the change in the transmitted intensity was recorded from the dc voltmeter.

The same experiment was also carried out under the crossed polarized microscope with a white light source, and several micrographs of the VA-CNT arrays-based homeotropic LC cell at different applied voltages were taken. When the applied voltage across the cell exceeds Fréedericksz threshold value, the director n̂ rotates from the initial homeotropic orientation to planar orientation, and the LC's effective birefringence, <Δn> changes as a function of the applied voltage.

In our optical setup, the director n̂ was oriented at 45° with the crossed polarizers at high voltage. Therefore, if $I_o$ is the intensity of the plane-polarized light incident on the VA-CNT arrays-based homeotropic cell, then the transmitted optical intensity, I at the exit of the analyzer shows an oscillatory behavior according to the equation $$I = I_O \sin^2\left(\frac{\pi d \langle \Delta n \rangle}{\lambda}\right) \quad (1)$$

where λ is the wavelength of the laser beam and d is the cell-gap.

Figure 2A:
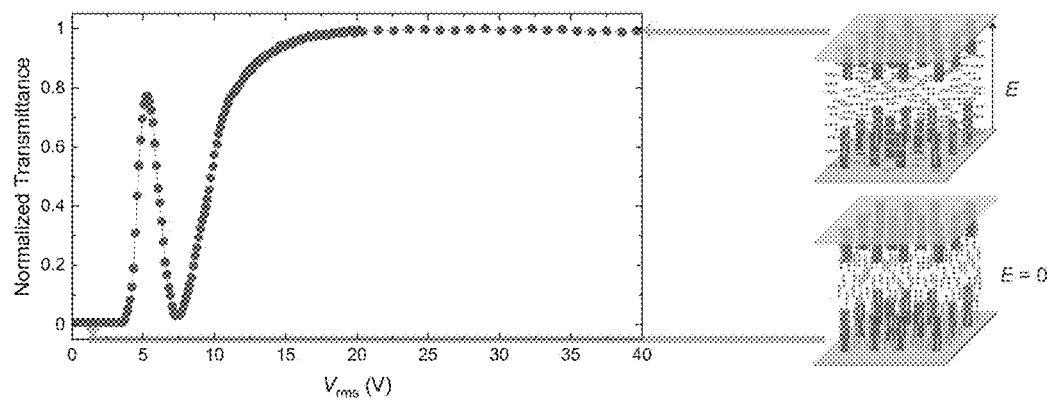
FIG. 2A shows the normalized transmittance of negative anisotropic LC-BYVA01 in the VA-CNT arrays-based homeotropic cell (at T=22° C.) as a function of applied ac voltage (f=1000 Hz); Schematic representations of voltage on and voltage off state of LC-BYVA01 in the VA-CNT arrays-based homeotropic cell.

FIG. 2A represents the electro-optical effect of the VA-CNT arrays-based homeotropic LC cell. FIG. 2A exhibits the normalized transmittance (i.e., normalized I|I$_o$) of negative anisotropic LC-BYVA01 in the VA-CNT arrays-based homeotropic cell as a function of the applied ac voltage.

Note that LC-BYVA01, being negative anisotropic, exhibits the oscillatory response in the homeotropic cell, according to Equation 1, as it undergoes homeotropic to planar orientation.

The number of oscillations (i.e., the number of maxima during a complete reorientation of the director) in the transmittance vs. voltage curve in FIG. 2A is given by (d Δn/λ). Using Δn=0.092 for LC-BYVA-01, λ=633 nm for the He—Ne laser and, the LC cell-gap, d=9 μm, we obtain (d Δn/λ)=1.3. This indicates that the transmittance curve should exhibit one full maximum. The transmittance curve in FIG. 2A clearly shows one full maximum before reaching its final saturation—which confirms a complete director rotation from the homeotropic state to the planar state in the VA-CNT arrays-based homeotropic cell. Also, the transmittance curve shows a sharp Fréedericksz transition, indicating that the VA-CNT arrays can supply the required amount of anchoring strength as the alignment agent in the cell.

EXAMPLE 6

Figure 2B:
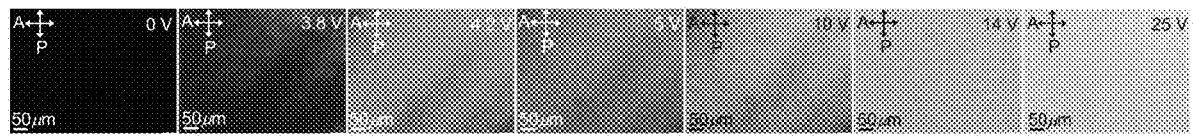
FIG. 2B represents seven separate micrographs of the VA-CNT arrays-based homeotropic cell filled with LC-BYVA01 under the crossed-polarized optical microscope at different applied voltages.

FIG. 2B shows the micrographs of the LC-BYVA01 texture in the VA-CNT arrays-based homeotropic cell under the crossed-polarized microscope at different applied voltages. The results indicate that the VA-CNT arrays-based homeotropic cell exhibits the essential electro-optical effect—where the VA-CNT arrays are employed as the homeotropic-alignment agent.

To realize the LC's planar-alignment quality in this the VA-CNT arrays-based homeotropic cell at a high voltage, an ac voltage V=25V (f=1000 Hz) was first applied across the cell, and then, the cell was rotated under the crossed-polarized microscope. The change in the transmitted intensity through the cell was recorded at every 2° rotation-step, while the applied voltage was kept constant at 25V. The results are presented in FIG. 3. When the LC achieves planar state at high voltage, the angle between the average LC director n̂ and the polarizer is defined by θ.

Figure 3:
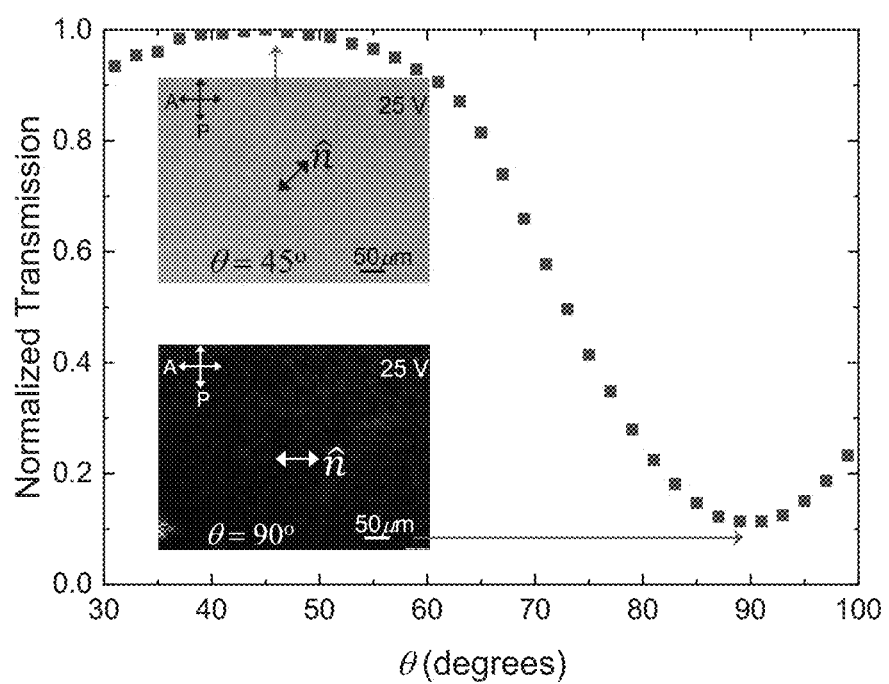
FIG. 3 illustrates the normalized transmitted intensity through the VA-CNT arrays-based homeotropic cell with an applied voltage V=25V (f=1000 Hz) as a function of angle θ. The top inset and the bottom inset show the crossed-polarized micrographs of the LC texture in the cell, where θ=45° and 90°, respectively.

The graph in FIG. 3 shows the normalized transmitted intensity of the VA-CNT arrays-based homeotropic cell filled with LC-BYVA01 under the crossed-polarized microscope as a function of θ with the applied voltage. The top inset and the bottom inset in FIG. 3 represent the micrographs of the LC texture in the cell, where θ=45° and 90°, respectively. This transition of the transmitted intensity from a uniform bright texture to a uniform dark texture at every 45° rotation confirms that at high voltage, the LC achieves uniform planar-alignment in the cell. This good uniformity of planar alignment under applied voltage was obtained due to the slightly tilted CNTs that give an azimuthal (in-plane) anisotropy to the LC molecules.

EXAMPLE 7

Figure 4:
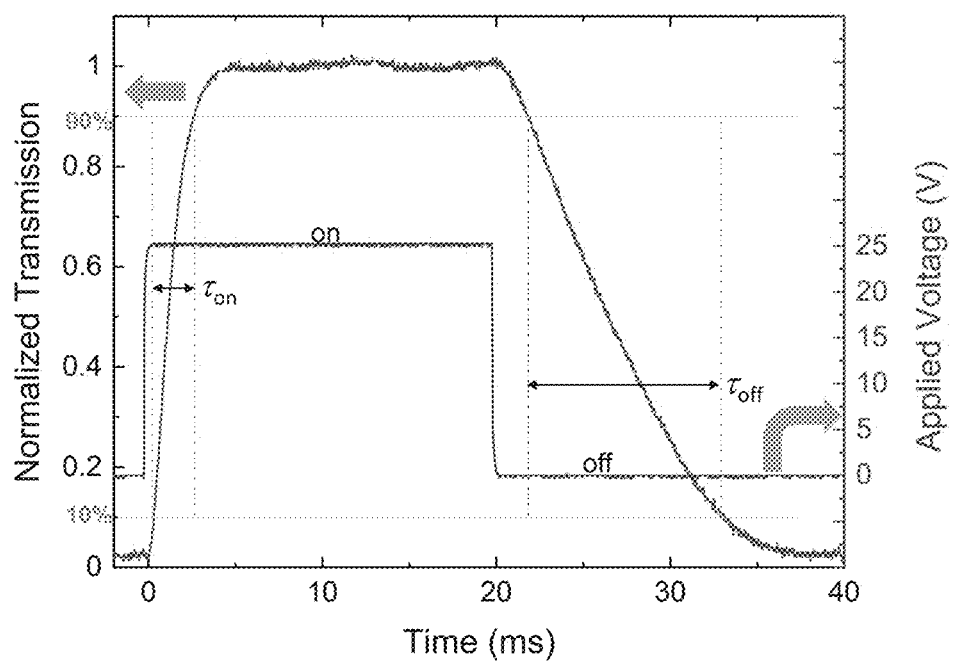
FIG. 4 shows the dynamics of electro-optic response for the VA-CNT arrays-based homeotropic cell. The driving square wave voltage profile with f=25 Hz is shown on the right-hand y-axis. The left-hand y-axis represents the normalized transmitted intensity as a function of time as V is turned on (at t=0) and then turned off (at t=20 ms) at T=22° C.

The field-induced dynamic response in a homeotropic LC cell is given by two characteristic times, $\tau_{on}$ (voltage on) and $\tau_{off}$ (voltage off)—which are defined as $$\tau_{on} \propto \frac{\gamma_1 d^2}{|\Delta\varepsilon|\varepsilon_o V^2 - K_{33}\pi^2}; \tau_{off} \propto \frac{\gamma_1 d^2}{K_{33}\pi^2} \quad (2)$$

where d is the cell-gap, $\gamma_1$ is the rotational viscosity, Δε is the dielectric anisotropy, V is the applied voltage, $\varepsilon_0$ the is free space permittivity, and $K_{33}$ is the bend elastic constant. These switching times for the LC-BYVA01 in the VA-CNT arrays-based homeotropic cell were studied using the optical setup similar to the voltage-dependent transmittance experiment. In this case, the output of the detector was fed into a digital storage oscilloscope to detect the change in transmitted intensity as a function of time when a 25 V square-wave voltage of 25 Hz was applied across the cell. The field-induced dynamic response is shown in FIG. 4.

For a homeotropic cell, the optical switching on, $\tau_{on}$ is defined by the timespan needed by the transmitted intensity to rise from 10% to 90% of its maximum value when V is turned on. After V is turned off, the transmitted intensity through the test cell decreases, and the optical switching off, $\tau_{off}$ is defined by the time needed by the transmitted intensity to drop from 90% to 10% of its maximum value. For the LC-BYVA01 in the VA-CNT arrays-based homeotropic cell, we found that $\tau_{on}$=2.3 ms and $\tau_{off}$=10 ms from FIG. 4.

We have demonstrated that the VA-CNT arrays can function as the homeotropic-alignment agent in an LC cell due to the π-π electron stacking interaction between the LC and the CNT surface.

No (additional) ITO electrodes were needed in this cell as the Cr adhesion layers for the growth of the VA-CNT arrays successfully functioned as the transparent electrodes. This cell showed a typical Fréedericksz transition with the standard electro-optical effect when an electric field was applied across the cell.

The field-induced dynamic response exhibited the two characteristic times, $\tau_{on}$ and $\tau_{off}$.

Thus, the inorganic VA-CNT arrays can be an excellent alternative to the traditional organic PI layers for a homeotropic-alignment agent, such as under UV exposure and high-temperature environments.

This current invention offers several advantages and new features, including, but not limited to, the following.

The invention demonstrates the utility of vertically aligned carbon nanotube (VA-CNT) arrays as the homeotropic-alignment agent.

The invention discloses that the VA-CNT arrays-based LC device demonstrates an excellent electrically-controlled birefringence effect.

The VA-CNT arrays are not reactive to high-temperatures or UV radiations. Therefore, the invention enables a new product employing VA-CNT arrays as the homeotropic-alignment agent in an LC display to enhance the robustness of the device in adverse conditions, such as high-temperatures or UV radiations.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What I claim is:

1. An electro-optical liquid crystal cell, comprising:
   a first substrate;
   a first layer of chromium (Cr) on the first substrate;
   a first layer of vertically aligned carbon nanotubes (VA-CNT) capped with nickel nanoparticles on the first layer of Cr on the first substrate; and
   a layer of liquid crystal on the first layer of VA-CNT capped with nickel nanoparticles on the first layer of Cr on the first substrate.

2. The electro-optical liquid crystal cell of claim 1, further comprising:
   a second layer of VA-CNT capped with nickel nanoparticles on the layer of liquid crystal;
   a second layer of Cr on the second layer of VA-CNT capped with nickel nanoparticles on the layer of liquid crystal; and
   a second substrate on the second layer of Cr on the second layer of VA-CNT capped with nickel nanoparticles on the layer of liquid crystal.

3. The electro-optical liquid crystal cell of claim 2 comprising a π-π electron stacking interaction of VA-CNT capped with nickel nanoparticles; and wherein either the first or second layer of VA-CNT capped with nickel nanoparticles direct LC alignment in the vertical direction in the cell.

4. The electro-optical liquid crystal cell of claim 2 wherein the Cr layers comprise electrodes in the electro-optical liquid crystal cell.

5. The electro-optical liquid crystal cell of claim 4 wherein the first layer of Cr has a thickness of 2 nm; and wherein the second layer of Cr has a thickness of 2 nm.

6. The electro-optical liquid crystal cell of claim 5 wherein either the first or second layer of the VA-CNT capped with nickel nanoparticles are freestanding.

7. The electro-optical liquid crystal cell of claim 6 wherein either the first or second layer of the VA-CNT capped with nickel nanoparticles have multilayer graphitic sidewalls and a hollow core.

8. The electro-optical liquid crystal cell of claim 5 wherein either the first or second layer of VA-CNT capped with nickel nanoparticles have a site density of $2\times10^9$ cm$^{-2}$; wherein either the first or second layer of VA-CNT capped with nickel nanoparticles have a length of 1.4-2 μm; and wherein either the first or second layer of VA-CNT capped with nickel nanoparticles have a diameter of 70-100 nm.

9. The electro-optical liquid crystal cell of claim 5 wherein either the first or second layer of VA-CNT capped with nickel nanoparticles are tilted at about 2° from a vertical direction.

10. The electro-optical liquid crystal cell of claim 9 wherein an average distance between the first and second substrates is 9 μm.

11. The electro-optical liquid crystal cell of claim 5 wherein the layer of liquid crystal (LC) is a negative anisotropic LC material; and
    wherein the negative anisotropic LC material has a transition temperature $T_{NI}$=92° C., a dielectric anisotropy $\Delta\varepsilon$=−4.9, and a birefringence $\Delta n$=0.092.

12. The electro-optical liquid crystal cell of claim 11 wherein a nematic LC director aligns vertically along a CNT-long axis at the first and second substrates due to a π-π stacking interaction.

13. The electro-optical liquid crystal cell of claim 5 wherein the electro-optical crystal cell achieves homeotropic alignment.

14. The electro-optical liquid crystal cell of claim 5 wherein LC molecules are anchored to a wall of either the first or second layer of VA-CNT capped with nickel nanoparticles to enhance π-π stacking by maximizing a hexagon-hexagon interaction between LC benzene rings and a vertically aligned carbon nanotube honeycomb structure.

15. The electro-optical liquid crystal cell of claim 5 wherein the anchoring energy associated with the π-π stacking interaction is about 2.0 eV/molecule.

16. An electro-optical liquid crystal cell utilizing vertically aligned carbon nanotube arrays as a homeotropic alignment agent, comprising:
    a first and second substrate;
    a layer of chromium (Cr) on at least one of the first and second substrate;
    a layer of vertically aligned carbon nanotubes (VA-CNT) capped with nickel nanoparticles on the first layer of Cr on at least one of the first and second substrate; and
    a layer of liquid crystal on the layer of VA-CNT capped with nickel nanoparticles on the layer of Cr on at least one of the first and second substrate.

17. The electro-optical liquid crystal cell utilizing vertically aligned carbon nanotube arrays as the homeotropic alignment agent of claim 16
    wherein the nematic LC director aligns vertically along a CNT-long axis at the first and second substrates due to a π-π stacking interaction; and
    wherein the layer of Cr is utilized as an electrode in the electro-optical liquid crystal cell.

18. A method of making an electro-optical liquid crystal cell utilizing vertically aligned carbon nanotube arrays as the homeotropic alignment agent, comprising:
   providing a first substrate;
   providing a first layer of chromium (Cr) on the first substrate;
   providing a first layer of vertically aligned carbon nanotubes capped with nickel nanoparticles on the first layer of Cr on the first substrate; and
   providing a layer of liquid crystal on the first layer of vertically aligned carbon nanotubes capped with nickel nanoparticles on the first layer of Cr on the first substrate.

19. The method of making an electro-optical liquid crystal cell utilizing vertically aligned carbon nanotube arrays as the homeotropic alignment agent of claim 18, further comprising the step of:
   aligning a nematic LC director vertically along a CNT-long axis at the first substrate via a $\pi$-$\pi$ stacking interaction.

20. The method of making an electro-optical liquid crystal cell utilizing vertically aligned carbon nanotube arrays as the homeotropic alignment agent of claim 19
   wherein the first layer of Cr comprises an electrode in the electro-optical liquid crystal cell.

\* \* \* \* \*